United States Patent
Kim et al.

(10) Patent No.: US 6,693,689 B1
(45) Date of Patent: Feb. 17, 2004

(54) REFLECTIVE LIQUID CRYSTAL DISPLAY DEVICE

(75) Inventors: Yong Beom Kim, Kyongki-do (KR); Soon Bum Kwon, Kyongki-do (KR); Heume Il Baek, Seoul (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/536,636

(22) Filed: Mar. 28, 2000

(30) Foreign Application Priority Data

Mar. 31, 1999 (KR) ........................................ 1999-11108
Nov. 3, 1999 (KR) ........................................ 1999-48411

(51) Int. Cl.$^7$ ........................ G02F 1/1335; G02F 1/1343
(52) U.S. Cl. ........................ 349/113; 349/106; 349/115; 349/141
(58) Field of Search ................. 349/106, 113, 349/115, 141

(56) References Cited

U.S. PATENT DOCUMENTS

| | | | | |
|---|---|---|---|---|
| 3,663,390 A | * | 5/1972 | Fergason et al. | 204/157.65 |
| 4,061,417 A | * | 12/1977 | Katagiri | 349/96 |
| 5,249,071 A | * | 9/1993 | Yoshimizu et al. | 349/102 |
| 5,548,422 A | * | 8/1996 | Conner et al. | 349/98 |
| 5,602,662 A | * | 2/1997 | Rosenblatt et al. | 349/130 |
| 5,627,666 A | * | 5/1997 | Sharp et al. | 349/74 |
| 5,691,791 A | * | 11/1997 | Nakamura et al. | 349/113 |
| 5,757,832 A | * | 5/1998 | Uchida | 372/106 |
| 5,835,166 A | * | 11/1998 | Hall et al. | 349/15 |
| 5,895,106 A | * | 4/1999 | VanderPloeg et al. | 349/120 |
| 5,986,730 A | * | 11/1999 | Hansen et al. | 349/96 |
| 6,160,597 A | * | 12/2000 | Schadt et al. | 349/98 |
| 6,177,216 B1 | * | 1/2001 | Broer et al. | 430/7 |
| 6,281,957 B1 | * | 8/2001 | Oh et al. | 349/141 |
| 6,359,670 B1 | * | 3/2002 | Broer et al. | 349/115 |
| 6,369,869 B2 | * | 4/2002 | Schadt et al. | 349/129 |
| 6,407,783 B1 | * | 6/2002 | Ohgawara et al. | 349/110 |
| 6,420,001 B1 | * | 7/2002 | Coates et al. | 428/1.1 |
| 6,507,382 B1 | * | 1/2003 | Sakamoto et al. | 349/141 |

FOREIGN PATENT DOCUMENTS

| | | | | |
|---|---|---|---|---|
| JP | 57133438 | * | 8/1982 | G02F/1/137 |
| JP | 2000292801 | * | 10/2000 | G02F/1/1343 |

* cited by examiner

*Primary Examiner*—Robert H. Kim
*Assistant Examiner*—Jeanne Di Grazio
(74) *Attorney, Agent, or Firm*—LG. Philips LCD Co., Ltd.

(57) ABSTRACT

A reflective liquid crystal display includes a linear polarizer for converting natural light into linearly polarized light; a retardation film for converting the linearly polarized light into circularly polarized light; a liquid crystal layer for varying the phase of the light differently depending on the presence or absence of an electric field; a cholesteric liquid crystal color filter for selectively reflecting light received from the liquid crystal layer; and a black background for absorbing light passing through the color filter.

2 Claims, 8 Drawing Sheets

(OFF STATE)

(ON STATE)

REFLECTIVE LIQUID CRYSTAL DISPLAY DEVICE

CROSS REFERENCE TO RELATED APPLICATIONS

This application claims the benefit of Korean Patent Application No. 1999-11108, filed on Mar. 31, 1999, and the benefit of Korean Patent Application No. 1999-48411, filed on Nov. 3, 1999, each of which are hereby incorporated by reference for all purposes as if fully set forth herein.

BACKGROUND OF THE RELATED ART

1. Field of the Invention

The present invention relates to a liquid crystal display (LCD) device, and more particularly to a reflective LCD device including a cholesteric liquid crystal (CLC) color filter.

2. Description of Related Art

In general, LCD devices are divided into reflective LCD devices and transmissive LCD devices. The transmissive LCD device uses an internal light source such as a back light, while the reflective LCD device uses ambient light.

Particularly, since the reflective LCD device uses ambient light, the brightness of the display depends on circumstances. In an office, the reflective LCD device is lower in brightness than the transmissive LCD device and, accordingly the color purity of an absorption-type color filter used in the LCD should be sacrificed to increase the brightness.

FIG. 1 is a cross-sectional view of a conventional reflective liquid crystal display.

As shown in FIG. 1, the liquid crystal panel includes a linear polarizer 26, a retardation film 24, a diffuser film 22, a first substrate 10, a color filter 20, a common electrode 18, a liquid crystal layer 16, a reflective electrode 14 and a second substrate, each are stacked in the above-described order.

The reflective electrode 14 reflects light transmitted from outside the display and also functions as a pixel electrode. The reflective electrode 14 and the common electrode 18 apply a voltage to the liquid crystal layer 16 and change the orientation of liquid crystal molecules. The diffuser film 22 reduces a surface reflection of light and increases a viewing angle. The retardation film 24 such as a λ4 plate converts linearly polarized light into circularly polarized light. Further, the linear polarizer changes the natural light into linearly polarized light.

The reflective LCD device described above functions and acts as follows.

When natural light is incident into the LCD device, the natural light is converted into linearly polarized light by the linear polarizer 26, then converted into circularly polarized light by the retardation film 24. The circularly polarized light is converted into linearly polarized light while passing through the liquid crystal layer 16 and is reflected on the reflective electrode 14. The reflected polarized light is converted into circularly polarized light while passing through the liquid crystal layer again, then passes through the color filter to produce colored light.

The circularly polarized light is diffused to increase the viewing angle while passing through the diffuser film 22, then is converted again into linearly polarized light while passing through the retardation film 24. The linearly polarized light is displayed to the user after passing through the linear polarizer 26 in the form of images.

FIG. 2 shows the state of light while it passes through each of the components described above when an electric field is not applied to the liquid crystal layer.

The natural light is first converted into linearly polarized light through the linear polarizer 26. The linearly polarized light is changed into circularly polarized light through the retardation film 24. The circularly polarized light is converted again into linearly polarized light through the liquid crystal 16, then reflected by the reflective electrode 14. The reflected linearly polarized light is changed into circularly polarized light through the liquid crystal layer 16. The circularly polarized light is finally converted into linearly polarized light through the retardation film 24.

FIG. 3 shows the state of light while it passes through each of the components described above when an electric field is applied to the liquid crystal layer.

The natural light is first converted into linearly polarized light through the linear polarizer 26. The linearly polarized light is changed into circularly polarized light through the retardation film 24. The circularly polarized light is not changed when passing through the liquid crystal 16 as an electric field is applied to the liquid crystal 16, then reflected by the reflective electrode 14. The reflected circularly polarized light is not varied even when passing through the liquid crystal 16. The circularly polarized light is finally converted into linearly polarized light through the retardation film 24, then absorbed by the linear polarizer 26.

FIG. 4 is a graph illustrating the reflectivity of light with respect to the incident light of the LCD device described above. In FIG. 4, the X-axis indicates a wavelength λ, and the Y-axis indicates a reflectivity. Note that a dominant wavelength region is referred to as region A and other wavelengths are referred to as region B. As shown in the graph, though light's reflective index is relatively high in the region A, because light reflection is also carried out in the region B, the color purity of the LCD is reduced. It is required that the color purity is reduced in order to increase the transmissivity of the color filter, but just lowering the color purity to increase the brightness has a limitation.

Further, since the LCD having the configuration described above has a multi-layered structure in which each layer, i.e., each component differs from one another in reflective index, the intensity of the light is reduced while the light passes through each component. For example, the intensity of the light first is reduced while passing through the linear polarizer 26, and then also prominently is reduced after passing through the color filter 20, because part of the light is absorbed or reflected while passing through the color filter 20.

Further, though the observer can clearly see the image displayed due to a good contrast ratio in the center of the screen, the contrast ratio becomes lower as it gets far from the center of the screen, thereby deteriorating the display characteristic.

SUMMARY OF THE INVENTION

An object of the present invention is to provide a reflective liquid crystal display device having increased brightness without sacrificing color purity.

Another object of the present invention is to provide a reflective liquid crystal display device having high color purity and an improved contrast ratio.

In order to achieve the objects, in a first embodiment, a reflective liquid crystal display including a linear polarizer for converting natural light into linearly polarized light; a retardation film for converting the linearly polarized light into a circularly polarized light; a liquid crystal layer for varying the phase of the light differently depending on the presence of an electric field; a cholesteric liquid crystal color filter for selectively reflecting the light from the liquid crystal layer; and a black background for absorbing the light passing through the color filter.

The present invention also provides, in the first embodiment, a reflective liquid crystal display including first and second substrates opposite to and spaced apart from each other; a liquid crystal layer interposed between the first and the second substrates, the liquid crystal layer having a first switching mode in which the phase of light is changed while passing through it and a second switching mode in which the phase of light is not changed while passing through it; first and second electrodes for applying an electric field to the liquid crystal layer; a semiconductor element located on the second substrate, for switching an electric signal applied to the liquid crystal layer; a retardation film located on the first substrate, for converting a linearly polarized light a circularly polarized light; a linear polarizer located on the retardation film, for converting natural light into the linearly polarized light; a cholesteric liquid crystal color filter located on the second substrate, for selectively reflecting the light from the liquid crystal layer as a light of at least one color; and a black background located beneath the second substrate, for absorbing the light passing through the color filter.

The retardation film is a λ/4 plate. The black background is located beneath the color filter. The retardation film is located between the linear polarizer and the color filter. The black background is made of a polymeric material. The color filter is designed so that a wave bandwidth of the color filter can be controlled by adjusting the pitch of the cholesteric liquid crystal.

The present invention also provides, in a second embodiment, a reflective color liquid crystal display device, including first and second substrate, spaced apart from and opposite to each other; a liquid crystal layer interposed between the first and second substrates and having liquid crystal molecules and a λ/4; phase difference a linear polarizer arranged over the first substrate, the polarizer converting natural light into linearly polarized light; a retardation film arranged under the linear polarizer, the retardation film converting the linearly polarized light into circularly polarized light; a negative uniaxial film arranged between the retardation film and the liquid crystal layer, the uniaxial film compensating a phase difference between a direction of an incident light entering the liquid crystal layer and a direction of the liquid crystal molecules adjacent to the first and second substrates of the liquid crystal layer; a cholesteric liquid crystal color filter arranged under the liquid crystal layer, the color filter selectively reflecting the light from the liquid crystal layer; and a black background arranged under the color filter, the black background absorbing the light passing through the color filter.

The liquid crystal molecules have a homeotropic orientation when an electrical field is not applied.

The present invention also provides, in a third embodiment, a reflective color liquid crystal display device, including a first substrate; a second substrate spaced apart from and opposite to the first substrate, the second substrate including a plurality of pixel electrodes, and a common electrode being spaced apart from each other and being arranged thereon; a linear polarizer changing natural light into linearly polarized light and being positioned at an outer surface of the first substrate; a liquid crystal layer interposed between the first and second substrates and having liquid crystal molecules being oriented by a parallel electric field between the pixel electrode and the common electrode; a cholesteric liquid crystal color filter disposed between the liquid crystal layer and the second substrate, selectively reflecting the light from the liquid crystal layer; and a black background absorbing the light passing through the color filter.

The reflective color liquid crystal display device further includes a negative uniaxial film arranged on the liquid crystal layer.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiments of the invention, example of which is illustrated in the accompanying drawings.

Figure 1:
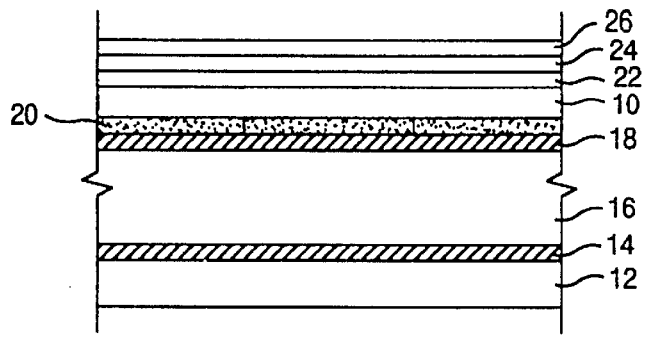
FIG. 1 is a cross-sectional view illustrating a conventional reflective liquid crystal display.
Figure 2:
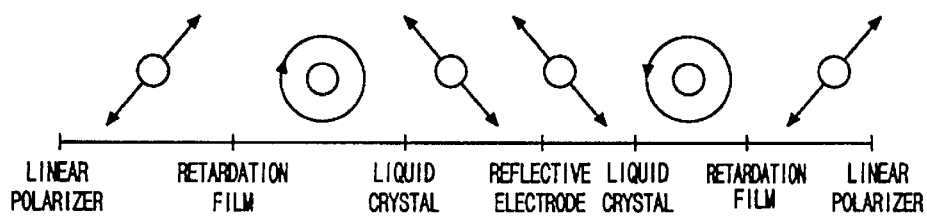
FIG. 2 is a schematic view illustrating the state of light while it passes through each component of a conventional reflective LCD device when an electric field is not applied to the liquid crystal layer.
Figure 3:
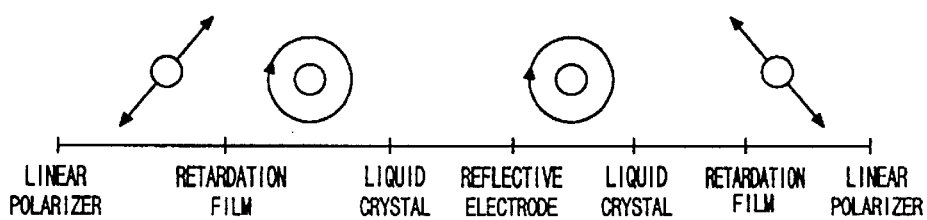
FIG. 3 is a schematic view illustrating the state of light while it passes through each component of a conventional reflective LCD device when an electric field is applied to the liquid crystal layer.
Figure 4:
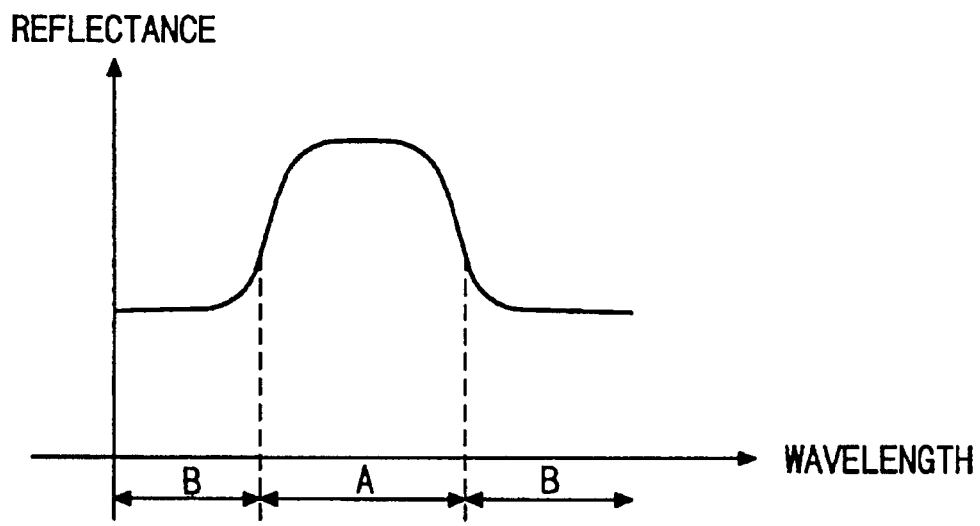
FIG. 4 is a graph illustrating the reflectivity with respect to the wavelength of the light that has passed through the color filter of the conventional liquid crystal display.
Figure 5:
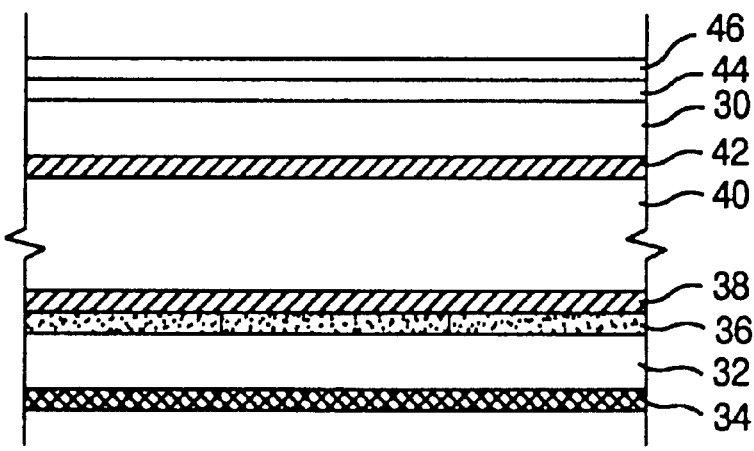
FIG. 5 is a cross-sectional view of a liquid crystal display according to a preferred embodiment of the present invention.

FIG. 5 shows a reflective LCD according to a first preferred embodiment of the present invention.

As shown in FIG. 5, first and second substrates 30 and 32 are made of a transparent insulating material and are spaced apart from and opposite to each other.

A first electrode 42 is arranged on the bottom surface of the first substrate 30. A retardation film 44 is disposed on the first substrate 30, and a linear polarizer 46 is disposed on the retardation film 44. The retardation film 44 is preferably a $\lambda/4$ plate. A black background 34 is formed on the bottom surface of the second substrate 32. The black background 34 is preferably made of a polymer material that can absorb light. A cholesteric liquid crystal (CLC) layer is deposited on the second substrate 32 and patterned for a CLC color filter layer 36. A transparent conductive metal layer is deposited on the CLC color filter layer 36 and patterned into the second electrode 38. Then, after the first and second substrates are spaced apart from each other with a predetermined gap and aligned with each other, the liquid crystal is injected into the gap.

The phase of light is either changed or not changed as it passes through the liquid crystal layer 40 according to the application of a voltage to the liquid crystal layer, which is done through the first and second electrodes.

The CLC color filter 36 is a color filter made of CLC and it selectively reflects or transmits incident light. For example, if the molecular structure of the CLC is twisted in the right direction, the color filter 36 reflects only right-handed circularly polarized light. The CLC color filter 36 includes a plurality of pixels. Each pixel has three sub-pixels so that the reflected light is colored to red (R), green (G) and blue (B) colors and, therefore each color has a dominant wavelength band leading to a high color purity.

As well known, all objects have their intrinsic wavelength, and the color that an observer recognizes is the wavelength of the light reflected from or transmitted through the object. The wavelength range of visible light is about 380 nm to 780 nm. The visible light region can be broadly divided into red, green, and blue regions. The wavelength of the red visible light region is about 660 nm, that of green is about 530 nm, and that of blue is about 470 nm.

The pitch of the liquid crystal is controllable and, therefore it is possible that the CLC color filter can selectively reflect light having the intrinsic wavelength of the color corresponding to each pixel thereby clearly displaying the colors of red (R), green (G), and blue (B) with a high purity.

The operation of the above-described LCD device will be described in more detail with reference to FIGS. 6 to 9, in which light states are shown assuming that the observer traces the light.

In order to implement a precise color, a plurality of the CLC color filters can be arranged, and the retardation film can also be arranged, not only on the first substrate but also on the second substrate. At this time, the retardation film is preferably arranged between the liquid crystal layer and the CLC color filter.

Further, a plurality of black backgrounds can be arranged on either surface of the second substrate to absorb unnecessary light.

Figure 6:
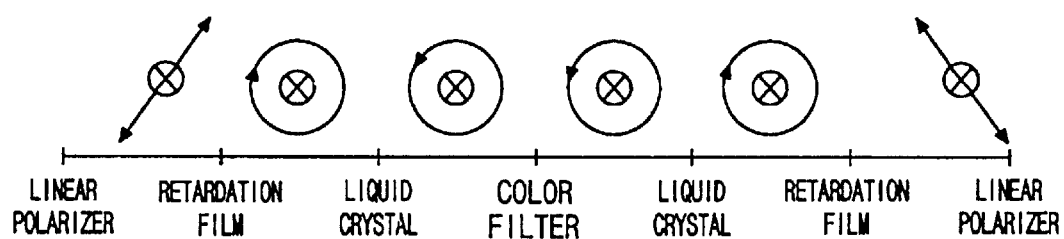
FIG. 6 is a schematic view illustrating the state of light while it passes through each component in the normally white (NW) mode when an electric field is not applied to the liquid crystal layer.

FIG. 6 shows the state of light while it passes through each component in the normally white (NW) mode device when an electric field is not applied to the liquid crystal layer.

The natural light is first converted into linearly polarized light through the linear polarizer 46. The linearly polarized light is changed into right-handed circularly polarized light through the retardation film 44. The right-handed circularly polarized light is converted again into left-handed circularly polarized light through the liquid crystal layer 40, then reflected from the color filter 36 that is designed to reflect only left-handed circularly polarized light. The reflected left-handed circularly polarized light is converted into right-handed circularly polarized light through the liquid crystal layer 36. The right-handed circularly polarized light is finally converted into linearly polarized light through the retardation film 44.

Figure 7:
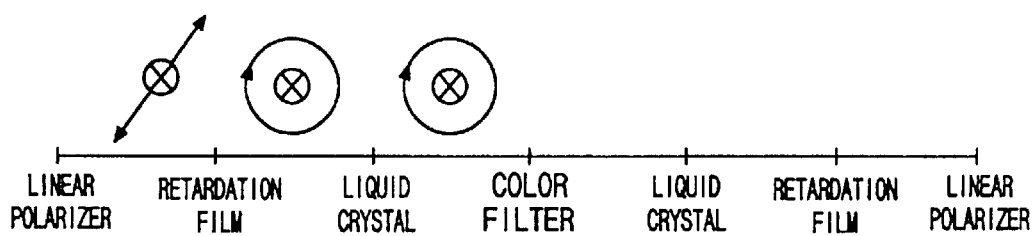
FIG. 7 is a schematic view illustrating the state of light while it passes through each component in the NW mode when an electric field is applied to liquid crystal layer.

FIG. 7 shows the state of light while it passes through each component in the NW mode device when an electric field is applied to the liquid crystal layer.

The natural light is first converted into linearly polarized light through the linear polarizer 46. The linearly polarized light is changed into right-handed circularly polarized light through the retardation film 44. The right-handed circularly polarized light passes through the liquid crystal layer 40 and the color filter 36 "as is", and then is absorbed by the black background 34 formed on either surface of the second substrate 32.

Figure 8:
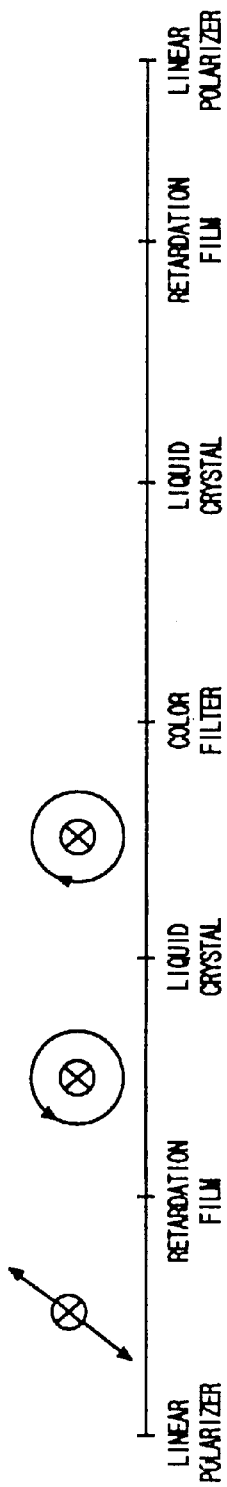
FIG. 8 is a schematic view illustrating the state of light while it passes through each component in the normally black (NB) mode when an electric field is not applied to liquid crystal layer.

FIG. 8 shows the state of light while it passes through each component in the NB mode device when an electric field is not applied to liquid crystal.

The natural light is first converted into linearly polarized light through the linear polarizer 46. The linearly polarized light is changed into left-handed circularly polarized light through the retardation film 44. The left-handed circularly polarized light is converted into right-handed polarized light through the liquid crystal layer 40, and then the right-handed polarized light passes through the color filter 36 "as is" and is absorbed by the black background 34 formed on either surface of the second substrate 32.

Figure 9:
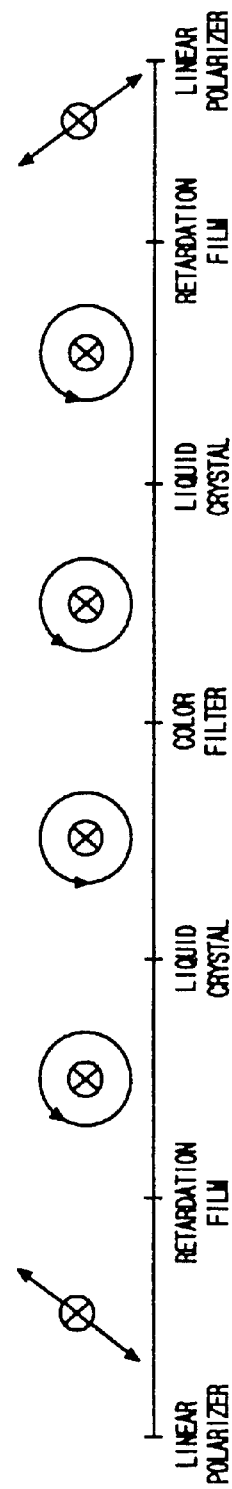
FIG. 9 is a schematic view illustrating the state of light while it passes through each component in the NB mode when an electric field is applied to the liquid crystal layer.

FIG. 9 shows the state of light while it passes through each component in the NB mode device when an electric field is applied to the liquid crystal layer.

The natural light is first converted into linearly polarized light through the linear polarizer 46. The linearly polarized light is changed into left-handed circularly polarized light through the retardation film 44. The left-handed circularly polarized light passes through the liquid crystal layer 40 "as is", and then is reflected from the color filter 36 which is designed to reflect only left-handed circularly polarized light. The reflected left-handed circularly polarized light passes through the liquid crystal layer 40 "as is", and is finally converted into linearly polarized light through the retardation film 44.

Figure 10:
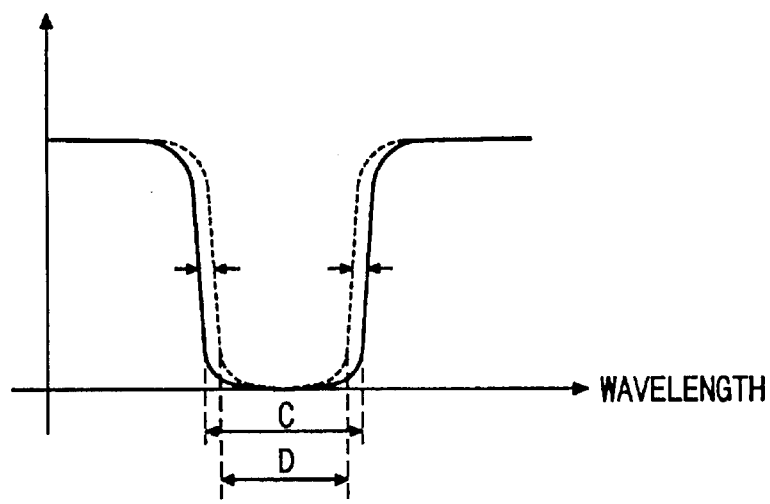
FIG. 10 is a graph illustrating the light transmissivity with respect to the wavelength of an incident light upon a liquid crystal display of the present invention.
Figure 11:
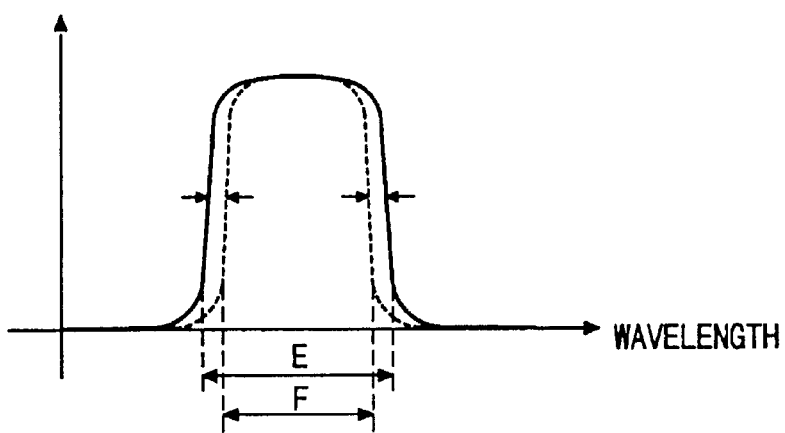
FIG. 11 is a graph illustrating the light reflectivity with respect to the wavelength of incident light, a liquid crystal display according to an embodiment of the present invention.

FIG. 10 is a graph illustrating the relationship between the selective transmittance and the wavelength of light for the color filter, and FIG. 11 is a graph illustrating the relationship between the selective reflectance and the wavelength of light for the color filter. The graph of FIG. 10 can also be applied to a liquid crystal device containing yellow, magenta, and cyan dyes, regardless of whether the LCD device is the transmissive or reflective type. Accordingly, a reflective LCD device which does not have a sufficient amount of light can be designed so as to display yellow, cyan and magenta, because these colors are relatively higher in brightness than the three basic colors.

The CLC color filter transmits circularly polarized light having the same orientation as that of the CLC, and reflects circularly polarized light having a different orientation from that of the CLC. That is, selective reflection of right - or left-handed circularly polarized light depends on the twisted direction of liquid crystal. For example, the CLC color filter can selectively reflect either right- or left-handed circularly polarized light, depending upon the structural characteristic of the CLC molecules. The reflective LCD device according to preferred embodiments of the present invention provides colors using the characteristic of the CLC color filter described above.

As shown in FIG. 10 the X-axis indicates a wavelength of light, and the Y-axis denotes transmissivity of light. The bandwidths C and D can be controlled by adjusting the pitch of the CLC color filter. As described above, transmitted light is absorbed by the black background and cannot be seen by the observer.

As shown in FIG. 11, the X-axis indicates the wavelength of the light, and the Y-axis denotes the reflective index of light. Likewise, the bandwidths E and F can be controlled by adjusting the pitch of the CLC color filter. As described above, the reflected circularly polarized light is displayed.

By properly adjusting the CLC color filter, it can transmit or reflect all colors except for a certain desired color, or alternatively, it can reflect or transmit only one color.

As described herein, the LCD device according to a first preferred embodiment of the present invention has the following advantages.

First, the CLC color filter selectively transmits light, and extraneous light is absorbed effectively by the black background, leading to a higher brightness.

Second, since the CLC color filter is arranged in the lower part of the LCD device, multi-reflections of light in the upper part of the LCD device can be minimized.

Third, the color purity can be greatly improved because the color purity does not have to be sacrificed.

A second preferred embodiment of the present invention is directed to improve the viewing angle and the color purity of the LCD device having the liquid crystal layer of a homeotropic orientation and the CLC color filter.

Figure 12:
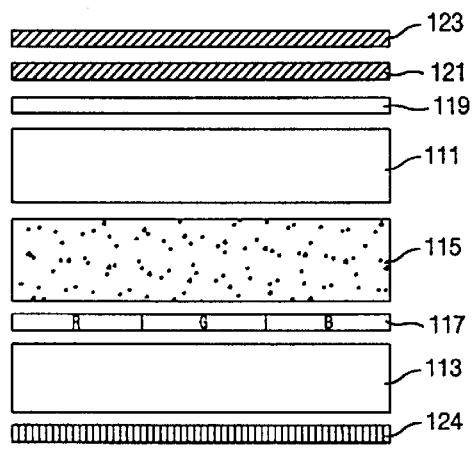
FIG. 12 is a cross-sectional view showing a reflective color LCD device according to a second preferred embodiment of the present invention.

FIG. 12 shows the reflective color LCD device according the second preferred embodiment of the present invention. As shown in FIG. 12, the reflective color LCD device includes upper and lower substrates 111 and 113 with the liquid crystal layer 115 interposed therebetween. The upper substrate 111 includes the polarizer 123, the retardation film 121 and a negative uniaxial film 119, which are stacked in the above-described order. The lower substrate 113 also includes the CLC color filter 117 and the black background 124. Though not shown, a transparent pixel electrode is arranged on the CLC color filter 117, and a common electrode is arranged on the bottom surface of the upper substrate 111 such that the two electrodes apply an electric field to the liquid crystal layer 115.

The controllable CLC color filter 117, according to the second preferred embodiment of the present invention, is preferably set to selectively reflect only right-handed polarized light. The negative uniaxial film 119 serves to compensate the color purity and to improve the contrast ratio and the viewing angle.

Figure 13A:
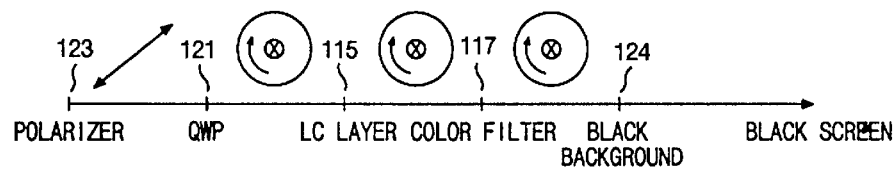
FIG. 13A is a schematic view illustrating the state of light while it passes through each component of the reflective color LCD device according to the second preferred embodiment of the present invention when the LCD device is in the OFF state.

FIG. 13A shows the state of light while it passes through each component of the reflective color LCD device according to the second preferred embodiment of the present invention when the LCD device is in the OFF state. As shown in FIG. 13A, the incident light passes through the linear polarizer 123 and is changed to linearly polarized light parallel to the transmission axis (i.e., 45°) of the linear polarizer 123. The linearly polarized light passes through the retardation film 121 and is changed to right-handed circularly polarized light. The right-handed circularly polarized light passes through the negative uniaxial film 119 and the liquid crystal layer of the homeotropic orientation whose molecules are vertical between the two substrates 111 and 113 "as is". Then, the right-handed circularly polarized light passes through the CLC color filter 117 and then is absorbed by the black background 124, resulting in a black screen.

At this point, the uniaxial film 119 compensates an optical phase difference according to a change in the anisotropy refractive index of liquid crystals. That is, it serves to induce the right-handed circularly polarized light from the retardation film 121 so that the right-handed circularly polarized light may pass through the CLC color filter 117 and then be effectively absorbed by the black background 124, leading to an improved dark characteristic of the reflective LCD device.

If the negative uniaxial film 119 described above is removed, the dark characteristic of the reflective LCD device is degraded, leading to a narrower viewing angle. This is because part of the right-handed circularly polarized light incident to the liquid crystal molecules of the homeotropic orientation has an angle with respect to the long axis of the liquid crystal molecules and, therefore the phase of the right-handed circularly polarized light differs due to the phase retardation, thereby changing the polarized light state. As a result, part of the right-handed circularly polarized light cannot be transmitted through the CLC color filter and reflects therefrom. Therefore, the negative uniaxial film 119 is used in order to compensate for such a phase retardation.

Figure 13B:
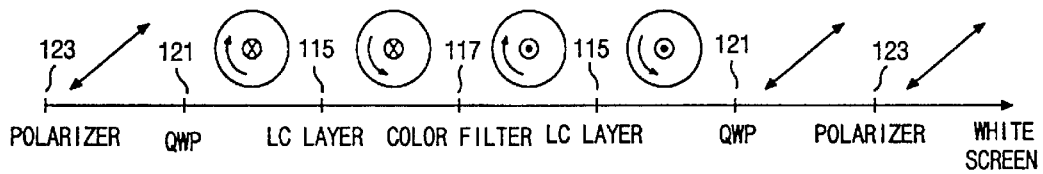
FIG. 13B is a schematic view illustrating the state of light while it passes through each component of the reflective color LCD device according to the second preferred embodiment of the present invention when the LCD device is in the ON state.

FIG. 13B shows the state of light while it passes through each component of the reflective color LCD device according to the second preferred embodiment of the present invention when the LCD device is in the ON state. When an electric field is applied, the liquid crystal molecules have the homogeneous orientation parallel to the substrates, so the liquid crystal molecules of the homogeneous orientation change the direction of the polarized light. For example, right-handed circularly polarized light is changed to left-handed circularly polarized light. As shown in FIG. 13B, light passes through the linear polarizer 123 and is changed to linearly polarized light. The linearly polarized light passes through the retardation film 121 and is changed to right-handed circularly polarized light. The right-handed circularly polarized light passes through the negative uniaxial film 119 "as is" and passes through the liquid crystal layer 115 and is changed to left-handed circularly polarized light. The left-handed circularly polarized light reflects from the CLC color filter 117 that is set to reflect left-handed circularly polarized light. The reflected left-handed circularly polarized light passes through the liquid crystal layer 115 again and is changed to right-handed circularly polarized light. The right-handed circularly polarized light passes through the retardation film 121 and is changed to linearly polarized light, parallel to the transmission axis (i.e., 45°), resulting in a white display screen.

At this time, when an electric field is applied to the liquid crystal layer 115, the liquid crystal molecules adjacent to the substrates contact the upper and lower substrates 11 and 113 due to the anchoring energy (i.e., the orientation restriction force in the direction of azimuth on the liquid crystal cell substrate plane), which is one of the important parameters of liquid crystal cells, and the long axis of the liquid crystal molecules becomes parallel to the direction of the electric field. The negative uniaxial film 119 compensates the phase difference between the light incident to the liquid crystal layer 115 and the liquid crystal molecules on the surfaces of the substrates, so the right-handed circularly polarized light from the retardation film 121 can be induced to desirably pass through the liquid crystal layer 115 and reflect on the CLC color filter 117.

The negative uniaxial film 119 can also be used in the mode that the liquid crystal molecules have the homogeneous orientation when the electric field is not applied.

A third preferred embodiment has a reflective in-plane switching (IPS) LCD device that includes the CLC color filter and the negative uniaxial film. The IPS LCD device has been introduced to obtain a wide viewing angle and has a structure in which the pixel electrode and the common electrode are arranged on the same plane.

Figure 14A:
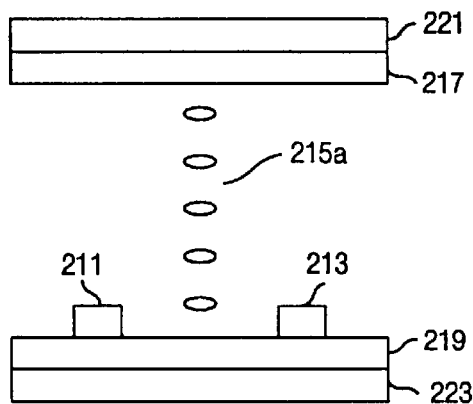
FIG. 14A is a cross-section view showing the conventional IPS LCD device when a parallel electric field is not applied to the pixel electrode and the common electrode.

FIG. 14A shows the conventional IPS LCD device when a parallel electric field is not applied to both the pixel electrode 211 and the common electrode 213.

As shown in FIG. 14A, the IPS LCD device includes the upper and lower substrates 217 and 219 with the liquid crystal layer 215a interposed therebetween. Further, the upper polarizer 221 is arranged on the upper substrate 217, and the lower polarizer 223 is arranged on the bottom surface of the lower substrate 223. The pixel electrode 211 and the common electrode 213 are both arranged on the lower substrate 219 and spaced apart from each other. The upper and lower substrates 217 and 219 are made of a transparent conductive metal such as ITO (Indium Tin Oxide). Liquid crystal molecules are aligned horizontally in one direction when voltage is not applied, blocking polarized light and resulting in a black screen. Because molecules are completely horizontal, viewing angle makes little difference.

Figure 14B:
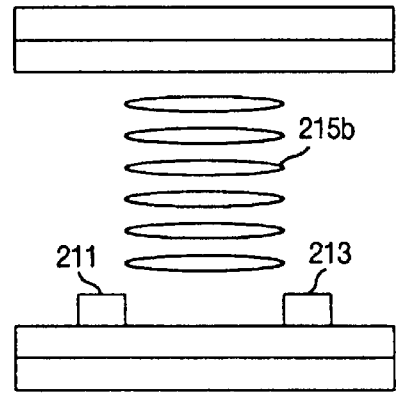
FIG. 14B is a cross-section view showing the conventional IPS LCD device when a parallel electric field is applied to the pixel electrode and the common electrode.

FIG. 14B shows the conventional IPS LCD device when the parallel electric field is applied to the pixel electrode 211 and the common electrode 213.

As shown in FIG. 14B, as voltage is applied to the electrodes, liquid crystal molecules are horizontally rotated up to 90° to line up with the polarizer. The light travels through the upper and lower polarizers untwisted, resulting in a white screen.

Figure 15:
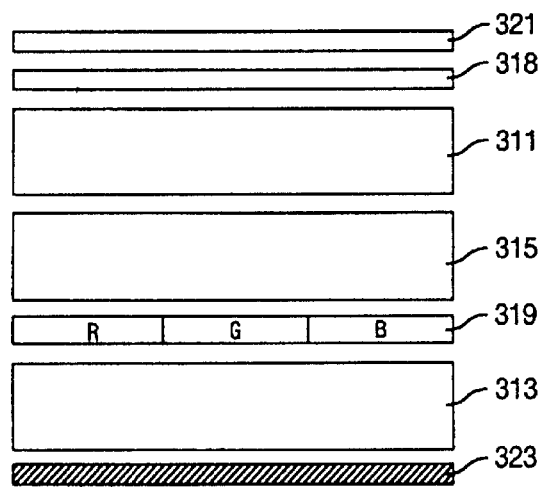
FIG. 15 is a cross-section view showing the reflective IPS LCD device that includes the CLC color filter and the negative uniaxial film according to the third embodiment of the present invention.

FIG. 15 shows the reflective IPS LCD device that includes the CLC color filter and the negative uniaxial film according to the third embodiment of the present invention.

As shown in FIG. 15, the reflective IPS LCD device includes a polarizer 321, a uniaxial film 318, upper and lower substrates 311 and 313 with the liquid crystal layer 315 interposed therebetween, a CLC color filter 319 on the lower substrate 313, and a black background 323. Though not shown, a plurality of pixel electrodes and common electrodes spaced apart from each other are arranged on the CLC color filter 319. The liquid crystal is a nematic liquid crystal, and the liquid crystal layer 315 acts as a quarter wave plate.

Figure 16A:
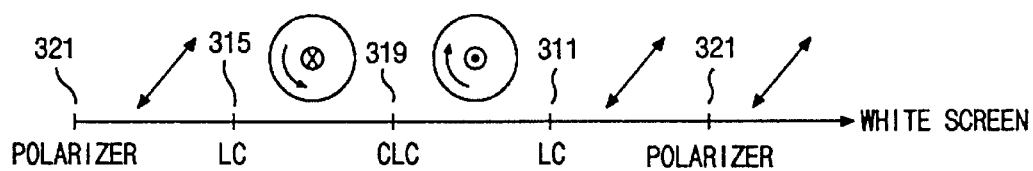
FIG. 16A is a schematic view showing the state of light while it passes through each component of the reflective IPS LCD device when an electric field is not applied.

FIG. 16A shows the state of light while it passes through each component of the reflective IPS LCD device when an electric field is not applied.

The liquid crystal molecules are horizontally aligned in the longitudinal direction of the pixel electrode and the common electrode when an electric field is not applied. Therefore, the linearly polarized light from the polarizer 321 is changed to left-handed circularly polarized light with a phase difference $\lambda/4$ after passing through the negative uniaxial film 318 and the liquid crystal layer 315. The left-handed circularly polarized light reflects from the CLC color filter 319 and is directed to the liquid crystal layer 315. Then the left-handed circularly polarized light from the liquid crystal layer 315 is changed to linearly polarized light parallel to the transmission axis of the polarizer 321, resulting in a white screen.

Figure 16B:
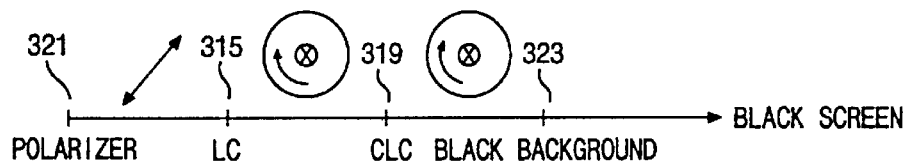
FIG. 16B is a schematic view showing the state of light while it passes through each component of the reflective IPS LCD device when an electric field is applied.

FIG. 16B shows the state of light while it passes through each component of the reflective IPS LCD device when an electric field is applied.

The liquid crystal molecules are horizontally rotated up to 90° to line up with the polarizer 321 when the electric field is applied. Therefore, the liquid crystal layer 315 serves to change the linearly polarized light into right-handed circularly polarized light. The linearly polarized light from the polarizer 321 passes through the liquid crystal layer 315 and is changed into right-handed circularly polarized light. The right-handed circularly polarized light is transmitted through the CLC color filter 319 "as is" and is absorbed by the black background 323, resulting in a black screen. The negative uniaxial film 318 acts as a film for compensating the viewing angle as in the second preferred embodiment of the present invention.

As described herein, the reflective LCD device according to the second and third preferred embodiments of the present invention have the following advantages.

First, the color purity is greatly improved and the brightness of the light becomes maximized due to the CLC color filter.

Second, a wide viewing angle and a high contrast ratio are attained due to the negative uniaxial film.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

For example, the color filter, black background, and retardation film can be positioned in other positions, or there can be more than one of any of these elements. That is, the retardation film may be formed on the cholesteric liquid crystal color filter on the second substrate, and more than two color filters and black backgrounds may be provided. Further, the black background may be formed on the second substrate.

What is claimed is:

1. A reflective color liquid crystal display device, comprising:
   first and second substrates spaced apart from and opposite to each other;
   a liquid crystal layer interposed between the first and second substrates having liquid crystal molecules;
   a linear polarizer arranged over the first substrate, the polarizer converting natural light into linearly polarized light;
   a retardation film disposed under the linear polarizer, the retardation film converting the linearly polarized light into circularly polarized light;
   a negative uniaxial film arranged between the retardation film and the liquid crystal layer, the uniaxial film compensating for a phase difference between a direction of an incident light entering the liquid crystal layer and a direction of the liquid crystal molecules adjacent to the first and second substrates of the liquid crystal layer;
   a cholesteric liquid crystal color filter disposed under the liquid crystal layer, the cholesteric liquid crystal color filter selectively reflecting light received from the liquid crystal layer; and
   a black background arranged under the color filter, the black background absorbing light passing through the cholesteric liquid crystal color filter.

2. The reflective color liquid crystal display device of claim 1, wherein the liquid crystal molecules have a homeotropic orientation when an electrical field is not applied thereto.

* * * * *